US011830056B2

(12) United States Patent
Gong et al.

(10) Patent No.: US 11,830,056 B2
(45) Date of Patent: Nov. 28, 2023

(54) PROVIDING LOCAL RECOMMENDATIONS BASED ON IMAGES OF CONSUMABLE ITEMS

(71) Applicant: Microsoft Technology Licensing, LLC, Redmond, WA (US)

(72) Inventors: Julia X. Gong, Cary, NC (US); Jyotkumar Patel, Bellevue, WA (US); Yale Song, Redmond, WA (US); Xuetao Yin, Bellevue, WA (US); Xiujia Guo, Bellevue, WA (US); Rajiv S. Binwade, Bellevue, WA (US); Houdong Hu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 23 days.

(21) Appl. No.: 17/102,009

(22) Filed: Nov. 23, 2020

(65) Prior Publication Data
US 2022/0164853 A1 May 26, 2022

(51) Int. Cl.
*G06Q 30/0282* (2023.01)
*G06F 18/22* (2023.01)
(Continued)

(52) U.S. Cl.
CPC ......... *G06Q 30/0631* (2013.01); *G06F 18/22* (2023.01); *G06N 3/04* (2013.01);
(Continued)

(58) Field of Classification Search
CPC ........... G06Q 30/0631; G06Q 30/0205; G06Q 30/0282; G06Q 30/0639; G06Q 50/01;
(Continued)

(56) References Cited

U.S. PATENT DOCUMENTS 5,444,819 A * 8/1995 Negishi .................. G06Q 40/02
706/31
6,917,952 B1 * 7/2005 Dailey .................. G06F 40/216
707/E17.084

(Continued)

OTHER PUBLICATIONS

Food Detection System Design by Deep Convolutional Neural NetworksSun, Jianing. ProQuest Dissertations and Theses ProQuest Dissertations Publishing. Published Mar. 26, 2019.*

(Continued)

*Primary Examiner* — Timothy Padot
(74) *Attorney, Agent, or Firm* — Schwegman Lundberg & Woessner, P.A.

(57) ABSTRACT

The present disclosure provides method and apparatus for determining a food item from a photograph and a corresponding restaurant serving the food item. An image is received from a user, the image being associated with a consumable item. One or more ingredients of the consumable item in the image is identified along with a location of the user and using a neural network, determining one or more similar images from a database. A restaurant associated with each of the one or more similar images is determined along with a similarity score indicating a similarity between the restaurant and the identified content of the image. The one or more restaurants and/or associated similar food items are ranked based on the similarity score and a list of ranked restaurants is provided to the user.

20 Claims, 12 Drawing Sheets

(51) Int. Cl.
*G06Q 30/0601* (2023.01)
*G06N 3/08* (2023.01)
*G06Q 30/0204* (2023.01)
*G06N 3/04* (2023.01)
*G06Q 50/00* (2012.01)
*G06V 10/32* (2022.01)

(52) U.S. Cl.
CPC ............ *G06N 3/08* (2013.01); *G06Q 30/0205* (2013.01); *G06Q 30/0282* (2013.01); *G06Q 30/0639* (2013.01); *G06Q 50/01* (2013.01); *G06V 10/32* (2022.01)

(58) Field of Classification Search
CPC . G06F 18/22; G06N 3/04; G06N 3/08; G06N 3/045; G06N 20/00; G06V 10/32; G06V 10/454; G06V 10/82; G06V 20/06
USPC ........................................................ 705/7.34
See application file for complete search history.

(56) References Cited

U.S. PATENT DOCUMENTS

| | | | |
|---|---|---|---|
| 2010/0150407 A1* | 6/2010 | Cheswick | G06V 40/172 382/118 |
| 2014/0086495 A1* | 3/2014 | Hao | G06V 20/10 382/218 |
| 2014/0104385 A1* | 4/2014 | Wong | G06Q 30/016 382/110 |
| 2016/0063692 A1* | 3/2016 | Divakaran | G06V 10/50 382/110 |
| 2018/0308143 A1* | 10/2018 | Chan | G06Q 30/0641 |
| 2020/0175564 A1* | 6/2020 | Kulasooriya | G06F 16/285 |
| 2021/0142097 A1* | 5/2021 | Zheng | G06V 10/25 |
| 2022/0012511 A1* | 1/2022 | Rowe | G06V 10/82 |

OTHER PUBLICATIONS

Where and what to eat: Simultaneous restaurant and dish recognition from food image. Wang, Huayang; Min, Weiqing; Li, Xiangyang; Jiang, Shuqiang. Springer Verlag, Jan. 1, 2016.*

Improving Food Recognition for Mobile Applications via Convolutional Neural Networks. Aykul, Mete. ProQuest Dissertations and ThesesProQuest Dissertations Publishing. (2019).*

Food image segmentation using edge adaptive based deep-CNNs. Burkapalli, Vishwanath C; Patil, Priyadarshini C. International Journal of Intelligent Unmanned Systems8.4: 243-252. Emerald Group Publishing Limited. (2020).*

A supervised extreme learning committee for food recognition Martinel, Niki; Piciarelli, Claudio; Micheloni, Christian. Computer Vision and Image Understanding 148: 67-86. Elsevier B.V. (Jul. 2016).*

"Bing shopping: Introducing new image-based product search", Retrieved from: https:blogs.bing.com/search/2020_06/Bing-shopping-introducing-new-image-based-product-search, Jun. 25, 2020, 4 Pages.

* cited by examiner

PROVIDING LOCAL RECOMMENDATIONS BASED ON IMAGES OF CONSUMABLE ITEMS

TECHNICAL FIELD

The present disclosure generally relates to providing machine learning supported image search results to users in accordance with some embodiments.

BACKGROUND

Sharing photos and videos in the digital age has become more than commonplace. Sending and receiving photos of cats, memes, recipes, outfits, and more have become part of people's daily lives. As photo and video sharing becomes more prevalent, an abundance of photographs traverses the internet that can be searched and found. However, it may become cumbersome to visually identify objects found in images.

SUMMARY

The methods and systems disclosed herein provide users with local recommendations based on food images. For example, a user browsing social media may see a social media post with an image of a consumable item, such as a food dish that looks appetizing. The social media post may not include the name of the dish so the user cannot rely on a text search. In this example, the user could provide the image of the food dish to disclosed recommendation system. The recommendation system in this example may return a list of local restaurants that serve similar dishes, or it may return information about local stores that sell ingredients identified in the food dish so that the user may make the dish at home. The recommendation system in this example may use one or more trained neural networks to identify the food dish and/or similar food dishes.

Embodiments of the present disclosure propose a method and apparatus for identifying food content in a photograph and concurrently providing a curated list of restaurants offering the identified food content. An image is received from a user, the image being including a consumable item. A location of the user is determined and a plurality of restaurants within a predetermined distance of the user is identified. A plurality of consumable item images associated with the plurality of restaurants is obtained and using a neural network, one or more images having similar consumable items are identified from the plurality of consumable item images. A similarity score is calculated for each identified image. The one or more identified images with similar consumable items include the one or more ingredients of the consumable item in the image. The restaurant associated with each identified image is identified and ranked based on the identified image's similarity score. A list of ranked restaurants is provided to the user. The one or more restaurants may also be provided to the user as through a widget when a user uploads, views, or otherwise interacts with an image containing food even if the user was not specifically searching for restaurants.

In some embodiments, the consumable item is an entrée offered at a restaurant. In some embodiments, image pre-processing is performed. In some embodiments, the image is passed through one or more trained convolutional neural networks to obtain an image embedding. An embedding is a mapping of a discrete categorical variable to a vector of continuous numbers used to reduce the dimensionality of categorical variables and meaningfully represent categories in the transformed space.

The obtained image embedding may be used to find nearest neighbors in an embedding space. In some embodiments, the embedding space is pre-trained, and the obtained image embedding is used to determine the contents of the received image and provide k-nearest neighbor recommendations.

In some embodiments, the consumable item includes one or more identifiable ingredients and the one or more contents that are identified are the one or more identifiable ingredients. In some embodiments, the restaurants are ranked based at least in part on the location of the user and a calculated different between the location of the user to a location of the restaurant. In some embodiments, the restaurants are ranked based at least in part on each restaurant's hours of service, take-out options, number of reviews, and/or score of reviews. In some embodiments, the restaurants are ranked based at least in part on an analysis on a number of matches of the one or more contents of the consumable item in the image to one or more contents of the one or more similar images. In some embodiments, the method includes providing a list of restaurants, ranking the one or more restaurants in descending order based on the similarity score, and including a name of the consumable item with the list of restaurants.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

This Summary is provided to introduce a selection of concepts that are further described below in the Detailed Description. It is not intended to identify key features or essential features of the claimed subject matter, nor is it intended to be used to limit the scope of the claimed subject matter.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
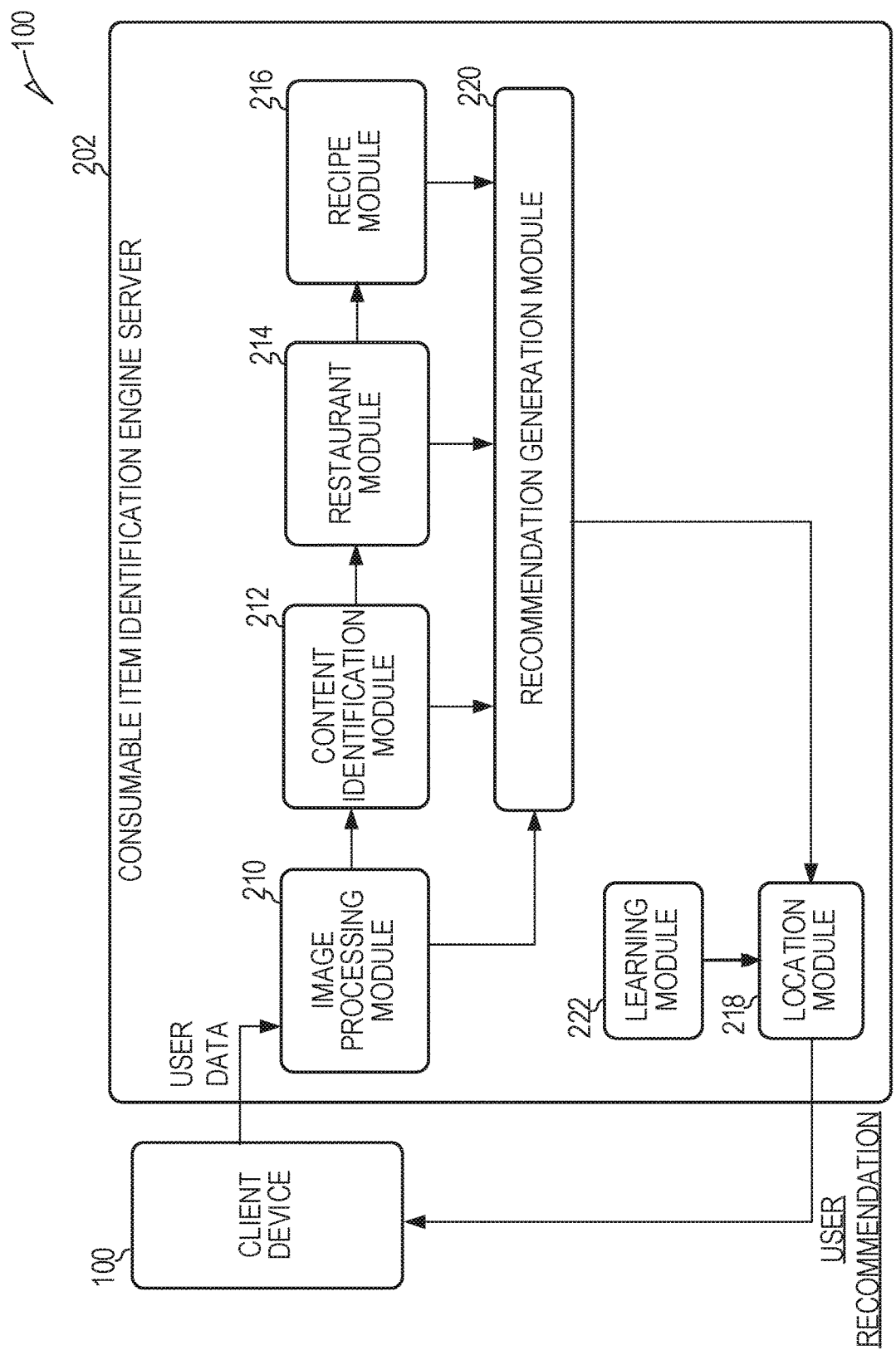
FIG. 1 is a diagram of an example computer system providing an image search result to a client device in accordance with some embodiments.

A particular challenge exists in creating systems to identify different food items from images, entrees, desserts, cocktails) especially food items from different ethnic cultures, and to also identify local restaurants and/or stores that provide food similar to an image of food. Further, it may be difficult to ascertain specific ingredients within a food item or the name of the food item when the image obstructs the view of some ingredients or for uncommon dishes at all a priori. It may also be difficult to ascertain how the food item is to be cooked/prepared based on the image.

Having a computer implemented system identify the food item is advantageous to provide a curated list of recommended restaurants serving the same or similar food item, providing recipes and local stores for the ingredients for the user to create the food item themselves, providing other similar images of the food for viewing pleasure, providing a history of the food item, and providing similar food items based on a user's dietary restrictions. Additionally and or alternatively, having an automated system that can recommend restaurants in geographic proximity relieves the user of the burden to separately identify the food item, determine its components, and piece the information together to find places that serve the item and are reasonable for them to visit, among other benefits.

A system and method are used to receive an image of food and search for similar images in a database of food-based images in an efficient manner. Searching for images in a database for food content is advantageous as the search does not require a name for the food content and can leverage unstructured image data directly from restaurants and/or other databases to perform the image search rather than relying on text from menus and/or user reviews to recommend restaurants. Further, a useful technical solution of identifying individual ingredients visible in an image provides granularity and flexibility in solving the technical problem of identifying an unfamiliar food item. The inventors have provided a solution that includes identifying ingredients of the food content, finding restaurants serving the food content, providing the name of the food content, and more, of which the details are discussed herein.

It is understood that this solution is not solely reserved for identifying entrées in a photograph and may have other uses such as identifying beverages, desserts, appetizers, and other consumable items.

The inventive subject matter will now be discussed with reference to several example implementations. It is to be understood that these implementations are discussed for enabling those skilled in the art to better understand and thus implement the embodiments of the present disclosure, rather than suggesting any limitations on the scope of the present disclosure.

Examples disclosed herein are directed to methods, apparatus comprising several modules and apparatus comprising one or more processors and memory embodied with executable instructions for providing curated recommendations based on an image content search. Using the disclosed examples, a client device is equipped with a search engine that can receive, process, and deliver information about the image content as well as corresponding similar images and restaurant information. A "search engine" may be referred to the entire device and software components for searching data that includes images and presenting identified image information to the user. The search engines disclosed herein may utilize one or more types of artificial intelligence including but not limited to machine learning, neural network, deep learning, computer vision, and natural language processing.

Having generally provided an overview of some of the disclosed examples, attention is drawn to the accompanying drawings to further illustrate some additional details. The illustrated configurations and operational sequences are provided to aid the reader in understanding some aspects of the disclosed examples. The accompanying figures are not meant to limit all examples, and thus some examples may include different components, devices, or sequences of operation while not departing from the scope of the disclosed examples discussed herein. In other words, some examples may be embodied or may function in different ways than those shown.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

Figure 8:
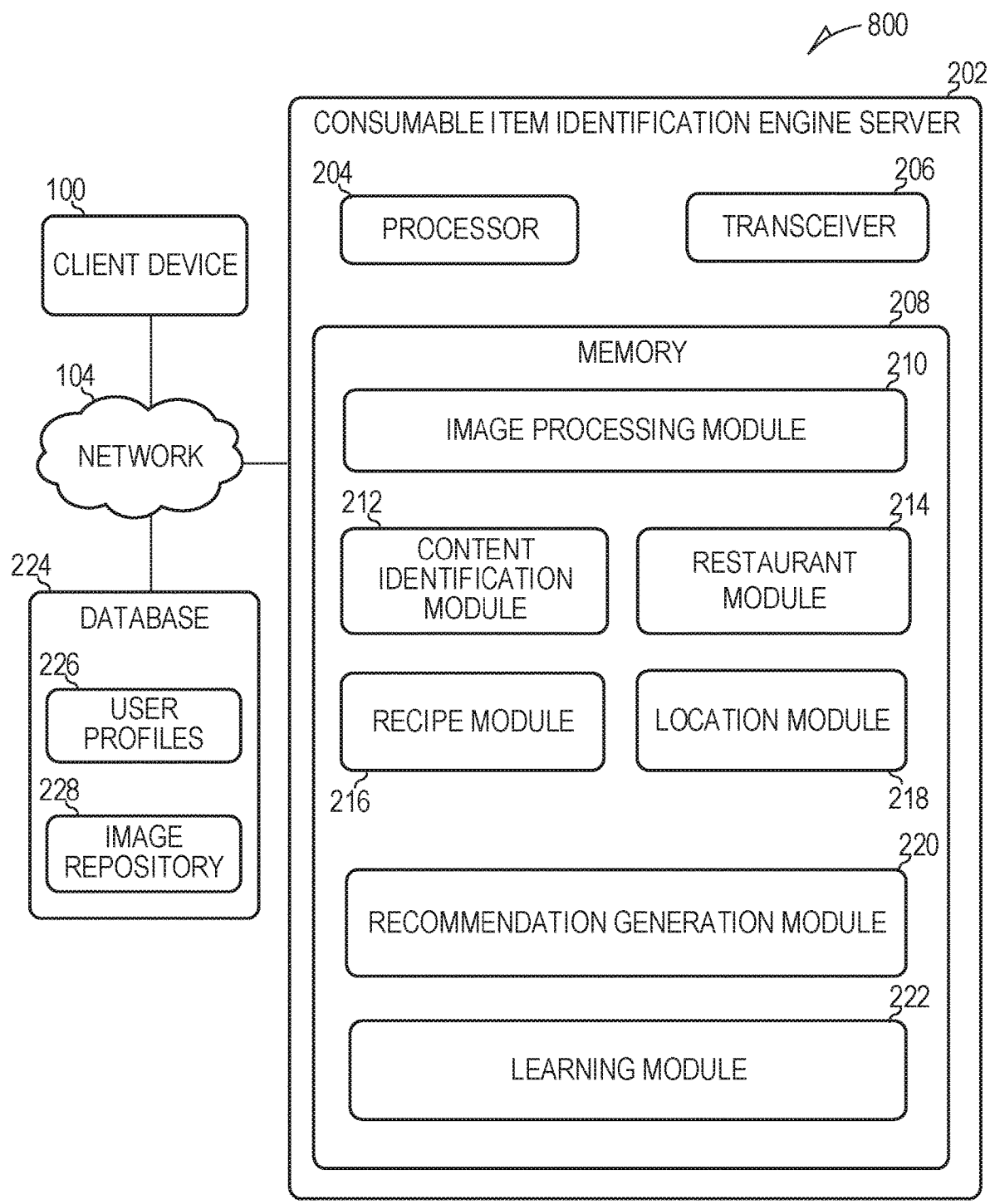
FIG. 8 is a block diagram of a computer system to implement one or more example embodiments.

FIG. 1 is a block diagram of consumable item identification engine server 202 providing curated image and restaurant recommendations to a client device 100 using the response generation module 220 as shown in FIG. 8. The client device 100 provides image data that was provided by the user, and user data, such as the user's location or other data entered by the user or obtained from the user profile, to the consumable item identification engine server 202. Additionally, and or alternatively, the consumable item identification engine may run on client device 100.

In some examples, the image and user data input flows to image processing module 210. Image processing module 210 may include various processing techniques to analyze the image in an efficient manner. In some embodiments, the image processing module 210 may process the image, the content identification module 212 may analyze the image to identify the contents of the image, the restaurant module 214 may analyze the identified contents of the image to select one or more restaurants serving the food item matching the identified contents of the image, and the recipe module 216 may provide corresponding recipes for the identified contents of the image. The user provided image, the determined processed image, the determined identified content, the determined restaurant, and the determined recipe, or any combination thereof may be provided to the recommendation generation module 220 in order to generate one or more recommendations to the provided to the user.

In some examples, to generate image search results, server 202 sequentially processes the image through the recommendation generation module 220. The recommendation generation module 220 may also consider the determined identified content, the determined restaurant, the determined recipe as determined by the content identification module 212, the restaurant module 214, and recipe module 216, respectively. The recommendation generation module 220 further processes the recommendation through location module 218. The location module 218 determines a location of the client device and/or the user of the client device to provide personalized (e.g., curated) recommendations specific to the user, such as based on proximity of the user to the determined restaurant. The search result is eventually provided back to the client device 100 for presentation to the user, and the procedure may be repeated for multiple search requests.

Figure 2:
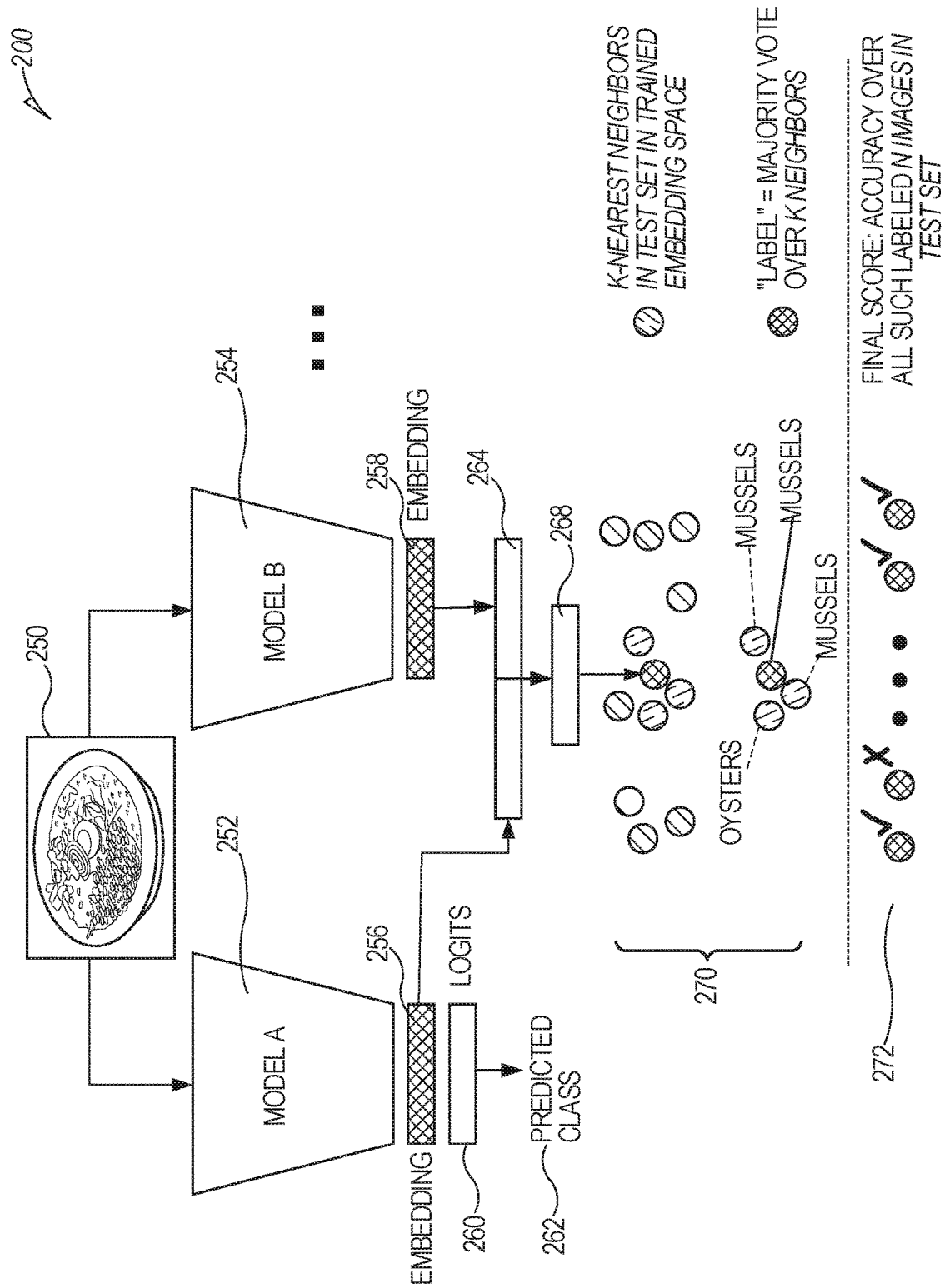
FIGS. 2-3 are diagrams of training databases for identifying consumable content items of an image in accordance with some embodiments.
Figure 3:
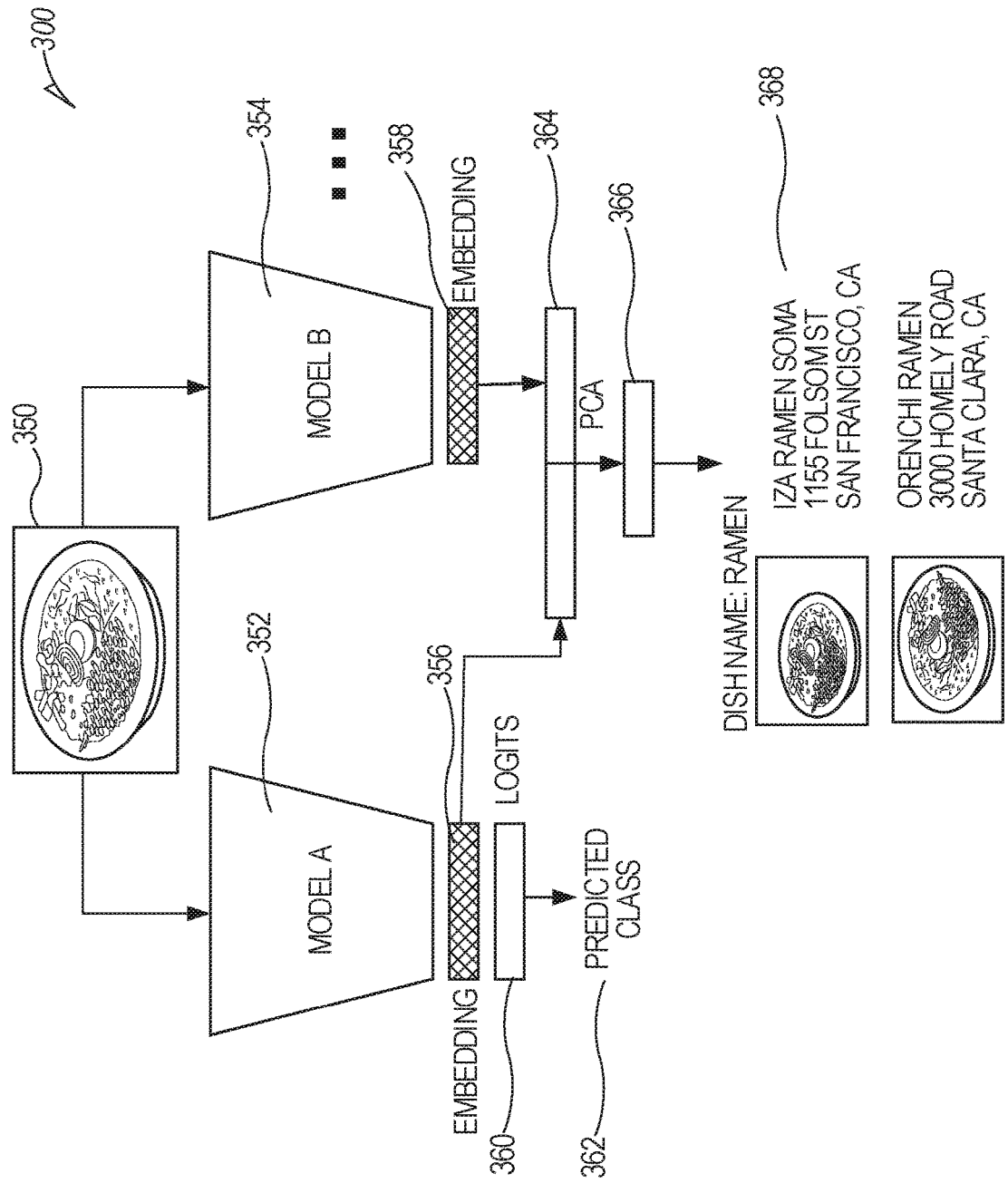

FIG. 2 and FIG. 3 illustrates an example image classification model 200 and 300 in accordance with some embodiments. FIG. 2 is shown with trained models based on ingredients identified in a dish, such as mussels and oysters. FIG. 3 is shown with trained models based on various dishes with Ramen illustrated as an example dish.

Prior to receiving an image query, image embeddings for all restaurant dish images in a database image cache are precomputed via one or more neural networks trained on one or more training sets of food images. The embeddings are low-dimensional, learned continuous vector representations of discrete variables. Neural network embeddings are useful because they can reduce the dimensionality of categorical variables and meaningfully represent categories in the transformed space.

After receiving an image query uploaded from a user, the uploaded image 250 is pre-processed (e.g., via channel-wise normalization, image resizing) and passed through one or more convolutional neural networks such as model A 252 and/or model B 254 to yield a high-dimensional image embedding 256 and 258. Both model A 252 and model B 254 (referred to as 352 and 354, respectively in FIG. 3) may be pre-trained on training sets of food-based images and combined to output an accurate classification of the received input. It is understood that there may be additional models as appropriate to obtain the final embedding. Example training sets include ImageNet, Recipe1m, Food101, and Menu-Match. Example neural networks include ResNet50, ResNeXt50, and DenseNet, and VGG, which may serve as model B 254. One such example neural network included approximately 25 million parameters and is convolutional neural network that is 50 layers deep.

In one example, the neural networks used include an image input layer that comprises a convolution layer with a kernel size of 7*7 and 64 different kernels all with a stride of size 2. Max pooling with also a stride size of 2. In the next convolution there is a 1*1,64 kernel following this a 3*3,64 kernel and at last a 1*1,256 kernel. These three layers are repeated in total 3 times, resulting in 9 layers. Next a kernel of 1*1,128 followed by a kernel of 3*3,128 and at last a kernel of 1*1,364. This is repeated 4 times for 12 layers.

These layers are followed by a kernel of 1*1,256 and two more kernels with 3*3,256 and 1*1,1024 and this is repeated 6 time giving a total of 18 layers. These layers are followed by a 1*1,364 kernel with two more of 3*3,364 and 1*1,2048 and this is repeated 3 times giving a total of 9 layers. After that, an average pool is performed, and the network is ended with a fully connected layer containing 1000 nodes and at the end a SoftMax function as an additional layer.

The training sets are labeled with both ingredients and dish names. Recipe1m dataset may be obtained by scraping public networks, such as the web for dish names and associated images. In one embodiment, a web-scrape identified 1.4 million images, 2106 classes/dishes. However, the resulted data was noisy and both from an image perspective and label perspective. A cleaned dataset resulted in 327,000 images with 517 classes.

In one example, model A 252 may be trained using a FoodIE and Recipe1m training datasets with shared body weights. Label spaces are preserved, and both datasets have different label granularities. In one embodiment, Recipe1m has more detail. Model A 252 may include an additional dataset such as a noisy FoodIE training set that has predicted pseudo labels generated by a baseline trained neural network. The use of an additional dataset provides additional training samples with less work required to label such additional samples. The resulting combined training set included approximately 598,000 images with a test set size of about 93,000 images.

In one embodiment, model A 252 includes a final layer 260 that performs a probability generation. The probability generation may be a SoftMax function, or a log-odds function, that is a function that represents probability as values from 0 to 1. The probability generation may be used to generate a predicted class 262 based on the highest probability. In one embodiment, the predicated class 262 may be used to generate a list of restaurants where dishes similar to the uploaded image may be found.

In a further embodiment, rather than using a single model A 252, model B 254 embeddings 258 in one embodiment may be combined with embeddings of final layer 260 to form joint embedding 264 representative of a lower layer or layers of two separate models. In one embodiment, the embeddings 405 and 258 may be simply concatenated to form joint embedding 264. Optionally, the embedding dimensionality of joint embedding 264 is reduced using dimensionality reduction techniques such as principal component analysis (PCA) resulting in a smaller joint embedding 268. The smaller joint embedding 268 may comprise 256 bits and provides a greatly reduced dataset for a following nearest neighbor analysis as indicated at 268.

After the uploaded image is pre-processed and passed through neural networks, in some embodiments, k nearest neighbors in the database image cache to the uploaded image are found at 270 in the common embedding space. The contents of the received image are classified by a plurality vote of its neighbors, with the object being assigned to the class most common among its k nearest neighbors. In some embodiments, different weights are assigned to the contributions of the neighbors to allow the nearer neighbors to contribute more to the average than the distant neighbors. The nearest neighbors can be found in a variety of ways including using approximate solutions. As shown in set 270, the k-nearest neighbors are selected. For example, the five nearest neighbors to the uploaded image may be found. As illustrated, the k-nearest neighbors in a test set in the trained joint embedding space may be identified. A label that is applied is based on a majority vote over the k neighbors. At 272, a final score is generated over all labeled n images in the test set.

Further, corresponding metadata may be retrieved and used to rank the identified restaurants in order of decreasing image similarity. The calculation and usage of similarity scores are described with respect to FIGS. 6A-6B.

In FIG. 3, the output comprises a list of restaurants with addresses that have been identified as serving a Ramen-like dish based on the input image 350. Note that the models 352 and 354 include embeddings 356 and 358. Model 352 also includes probability level 360 (similar to the final layer 260 that performs a probability generation). Embedding 356 and 358 are combined to form joint embeddings 364 that are reduced by PCA to form reduced embeddings 366 that are further used to identify nearest neighbors to generate the list of restaurants 368. As shown in FIG. 3 the recommendation may include a name of the food dish. In some embodiments, the included dish name may be based on the user's location (e.g., "chips" in England or "fries" in the United States). In some embodiments, recommendation may include a generic name for the food dish "ramen") and/or the name of the food dish used by the restaurant (e.g., "beef ramen special").

Figure 4:
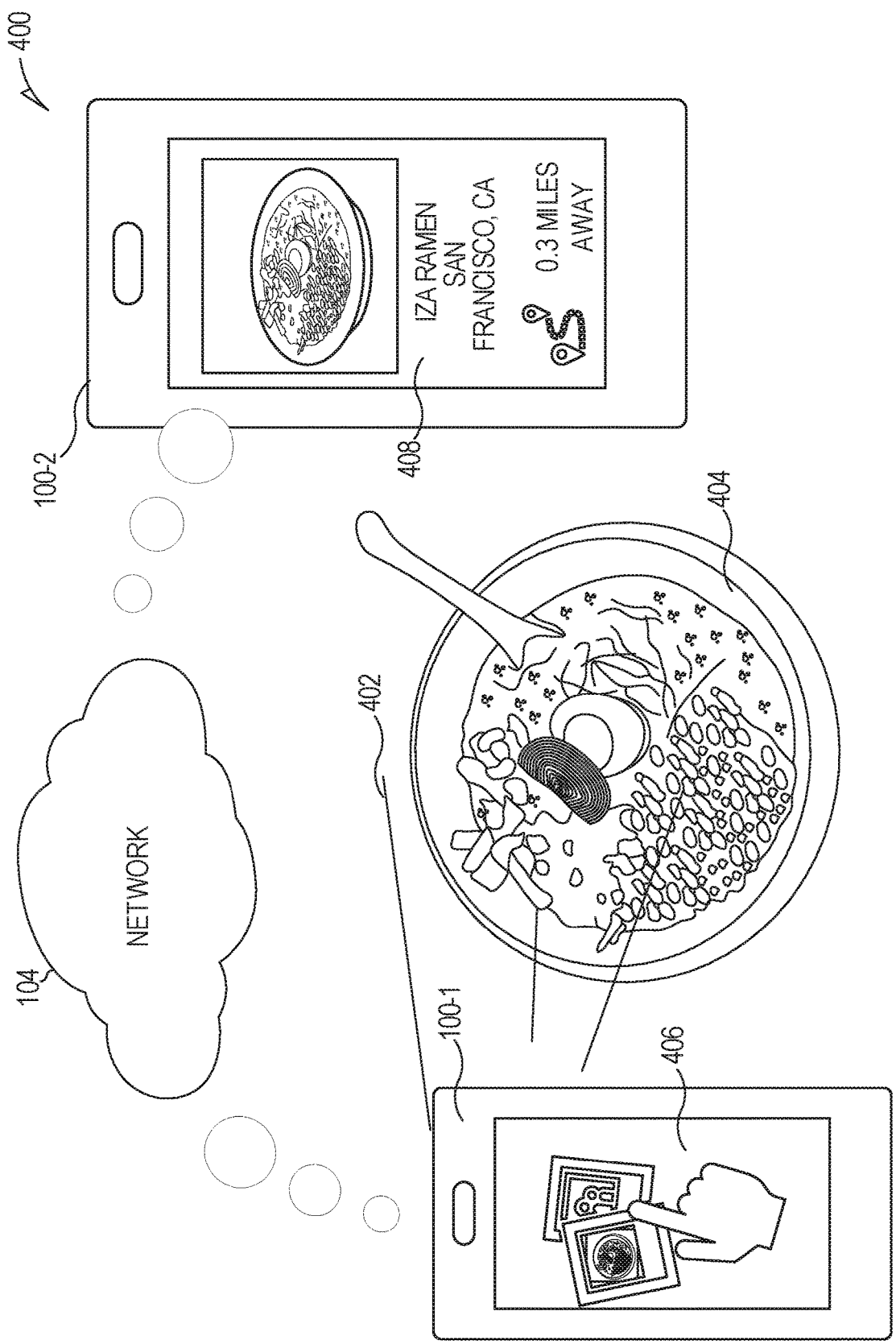
FIG. 4 is an example interaction between a user and the computer system for identifying consumable content items of an image and providing recommendations based on the identified content items in accordance with some embodiments.

FIG. 4 depicts an example situation of a plurality of electronic devices sending and receiving images in accordance with some embodiments. A first user device 100-1 may take a flash photograph 402 of a food item 404. The user of the first user device 100-1 may elect to post the photograph of food item 404 on the user's social media platform 406 via network 104. A second user device 100-2 may see the photograph of food item 404 and be interested in finding out more about the depicted food item. The second user device 100-2 may submit an image search query to network 104 to identify the contents of the image. In some embodiments, the user may also specify the user's location and a request for restaurants within a radius of the user's location. In some embodiments, without explicit definition from the user, a provided recommendation 408 is curated to include restaurants within a reasonable distance from the user (e.g., 25 miles). In some embodiments, the recommendation is curated to include restaurants based on one or more criteria (e.g., hours of operation, take-out availability, availability of the entrée itself). In some embodiments, the recommendation is curated to include recipes to make the identified food item. The recommendation can include a simplified version, a traditional version, a chef's version, or a combination of the above. Further, the recommendation can include, along with the recipes, a grocery list of ingredients to prepare the food item. In some embodiments, the recommendation can include a brief or extended history about the origins of the food item. The example provided recommendation 408 is an example representation thereof and may be provided to user device 100-2 in various configurations including recipes, grocery lists, and historical information.

In another example, a user may find a delightfully presented entrée item image on the user's social media platform. The user has never seen the entrée before and would like to identify it so that the user may try it for him/herself. The user presents the image to a search engine (e.g., Microsoft Bing) and asks the search engine to identify the entrée and nearby restaurants that offer the entrée for take-out. The search engine (e.g., consumable item identification engine server 202) determines what the entrée in the image is, and searches for restaurants offering the entrée and provides a curated list (e.g., via recommendation generation module 220) to the user with restaurants serving the entrée and ranked based on reviews, distance, hours of operations, takeout availability, and more. In some embodiments, the search engine provides a curated list to the user with famous, renown, and/or Michelin rated restaurants serving the entrée.

In some embodiments, the search engine outputs a name of the food item via content identification module 212), a recipe to prepare the food item (e.g., via recipe module 216), and an ingredients list to prepare the food item from the recipe. In some embodiments, the food item is a drink and the search engine output a name of the drink, a recipe to prepare the drink, and an ingredients list to prepare the drink from the recipe. In some embodiments, the search engine outputs one or more local restaurants (e.g via restaurant module 214) serving the food item as well as reviews of the specific food item from the one or more local restaurants. In some embodiments, the search engine outputs reviews of the one or more local restaurants provided in the output to the user.

FIGS. 5A-5D depict an example web browser and associated user interface for searching images in accordance with some embodiments. The example web browser 500 includes a user interface 502 and a search bar 504 within the user interface. The search bar 504 may be used to drop-in, upload, or otherwise place an image or image file for searching. It is understood that the methods, systems, and its implementations are not limited to web browsers but may further include applications, widgets, and other suitable means.

Figure 5A:
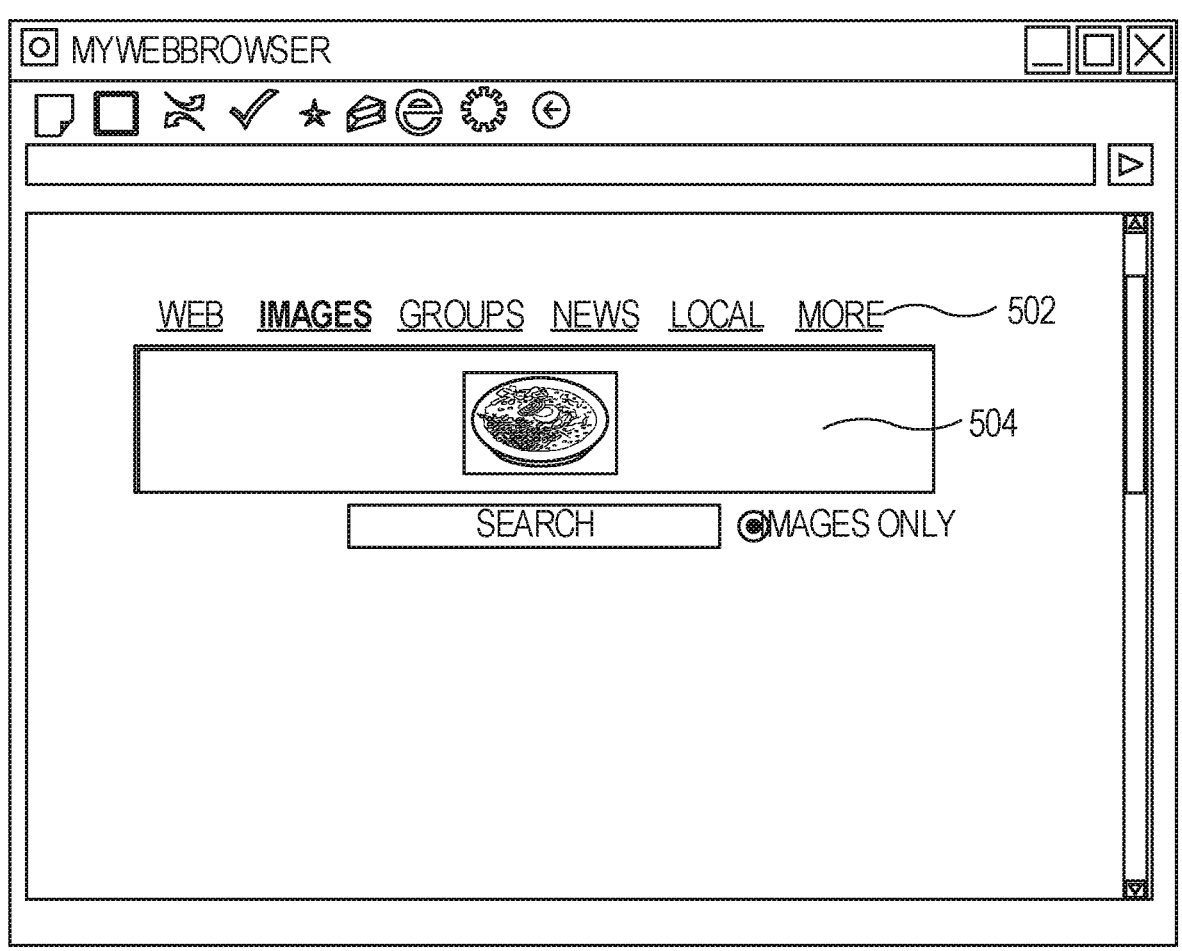
FIGS. 5A-5D depict an example user interface for identifying consumable content items of an image and providing similar images and recommendations based on the identified content items in accordance with some embodiments.
Figure 5B:
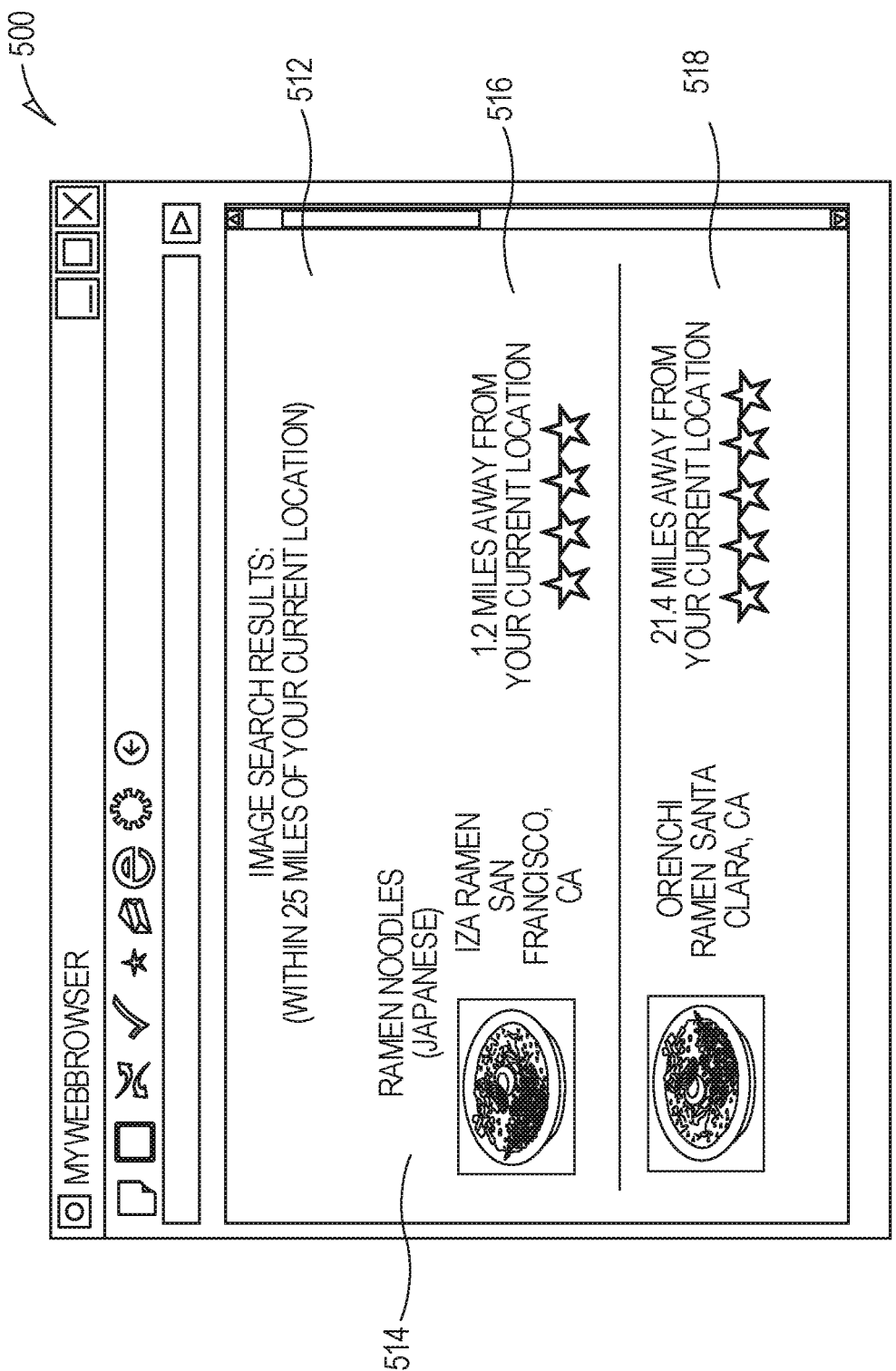

As shown in FIG. 5B, once a search query on the image is initiated on the web browser 500, an updated user interface 512 is displayed. The updated user interface 512 includes an identification of the food content in the image 514 "Ramen Noodles (Japanese)" and one or more restaurant recommendations 516, 518. The one or more restaurant recommendations may be provided in a ranked list based on location, reviews, price, availability of the food content, health score, hours of operation, take-out availability, online-ordering availability, and various other suitable criteria. In the example view, "Iza Ramen" is shown at the top of the list of restaurant recommendations. The restaurant is 1.2 miles away from the user's current location and has a four-star rating. In some embodiments, the rating is on the food content itself. In some embodiments, the rating is on the restaurant. Continuing with the example, "Orenchi Ramen" is shown second on the list of restaurant recommendations. Although "Orenchi Ramen" has a higher rating than "Iza Ramen" the recommendation lists "Iza Kamen" before "Orenchi Ramen" based on the distance of the restaurant to the user. In some embodiments, the restaurant recommendation may provide "Orenchi Ramen" at the top of the list based on a user profile (e.g., user profiles 226, FIG. 8) indicating the user is more likely to travel a farther distance to purchase items at a higher ranked establishment. In some embodiments, the recommendation takes into consideration a user's profile in determining how and what to provide to the user in the recommendation.

Figure 5C:
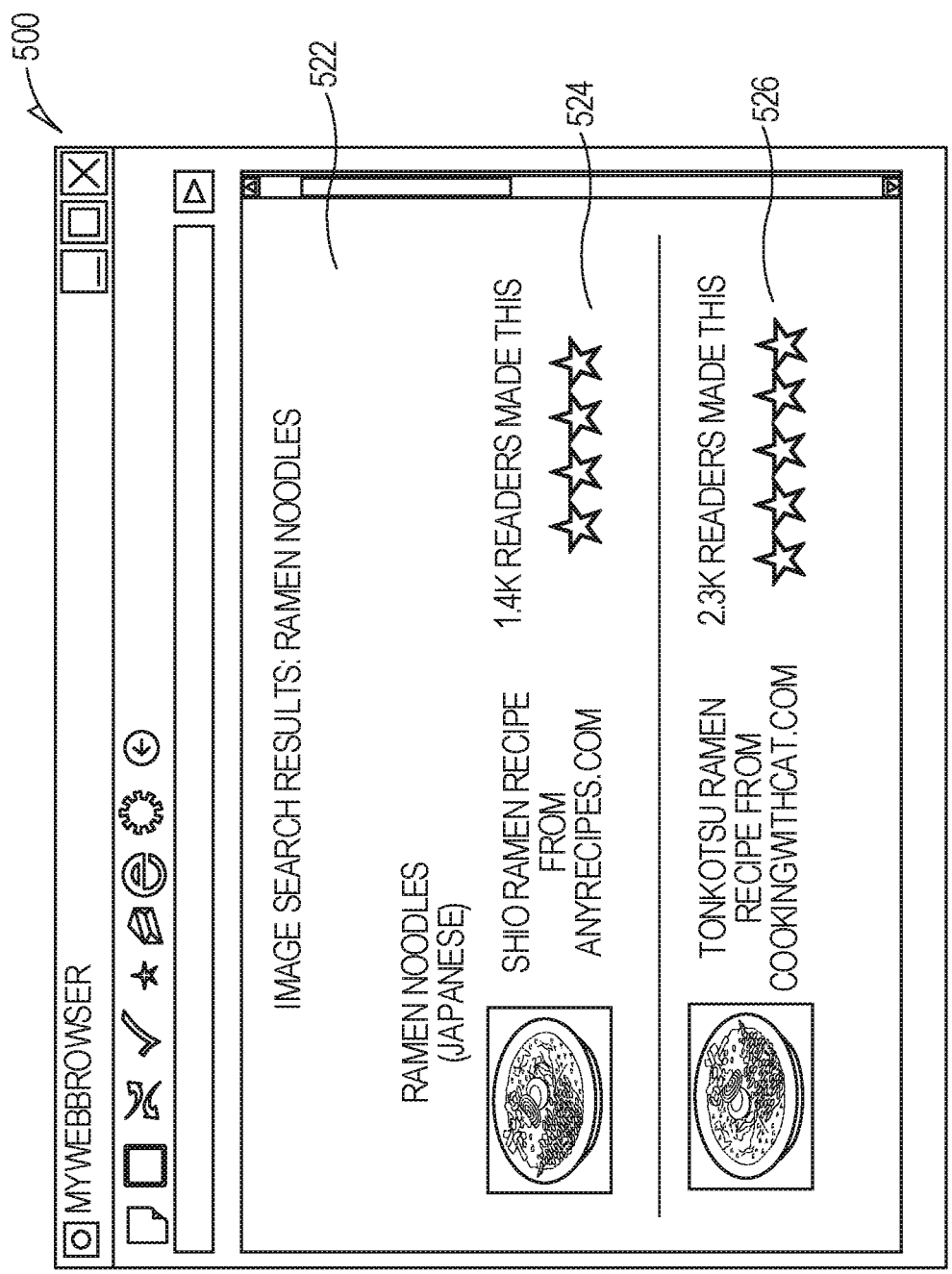

As shown in FIG. 5C. another updated user interface 522 is shown in another view of the example web browser 500. The updated user interface 522 includes a list of recipes to create the identified food content of the image 514. In some embodiments, the recommendation provides similar food content and corresponding recipes 524 and 526. The provided recipes may be provided based on a ranking of reviews, complexity of the recipe, the number of ingredients, compatibility with the user's dietary preferences, and more.

Figure 5D:
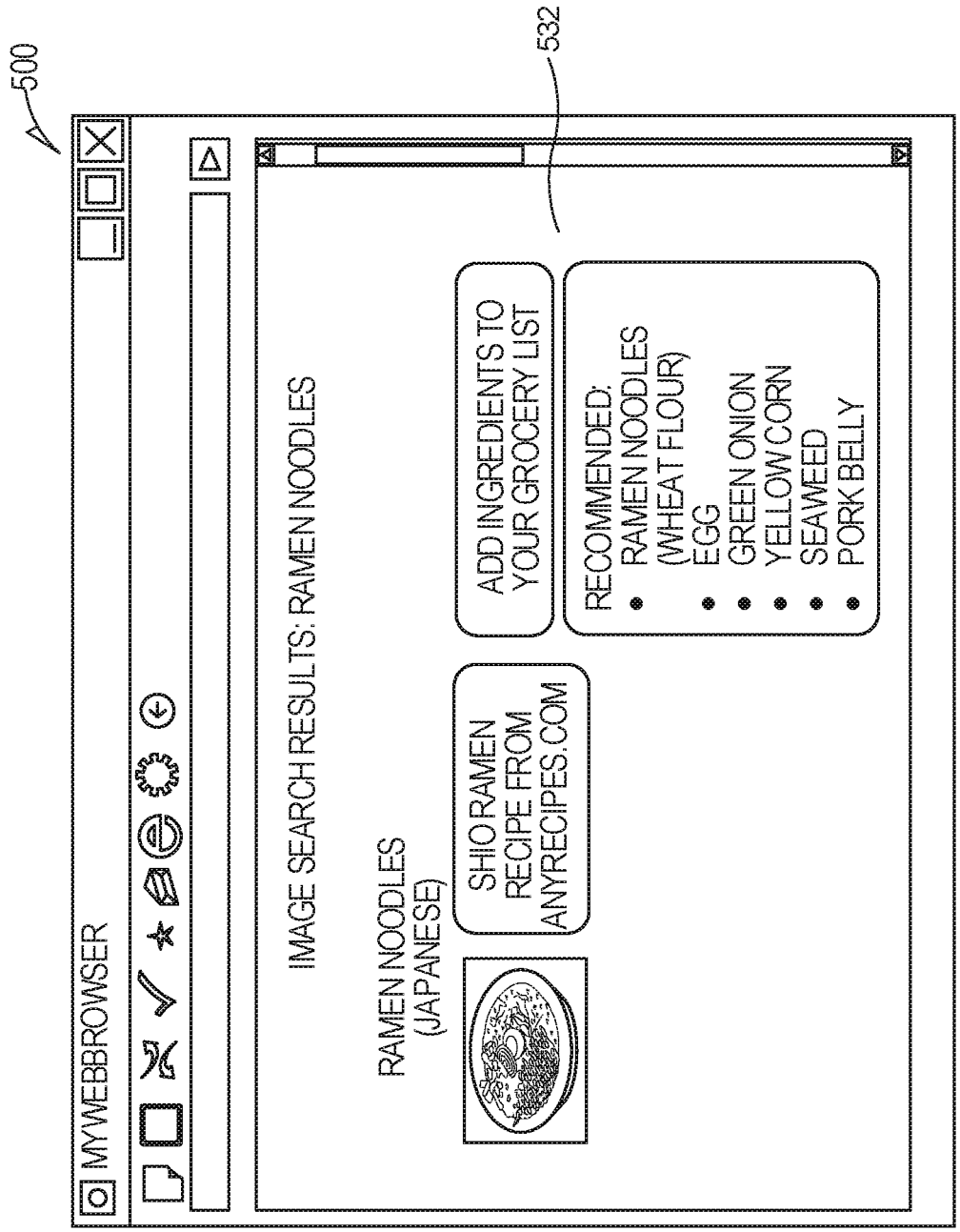

FIG. 5D shows another updated user interface 532 in another view of example web browser 730. The updated user interface 532 includes a recipe to create the identified food content as well as a view of recommended ingredients to be purchased at a local grocery store. The recommended ingredients may include one or more identified items within the image such as corn, seaweed, or noodles.

The recommended ingredients may also be identified as being available at specific specialty stores. For example, to make a ramen recipe, miso paste, seaweed, bean sprouts, and Japanese rice noodles are required and sold at a local Japanese grocery store. The recommendation may provide directions to the local Japanese grocery store for easy procurement of the receipt ingredients.

Figure 6A:
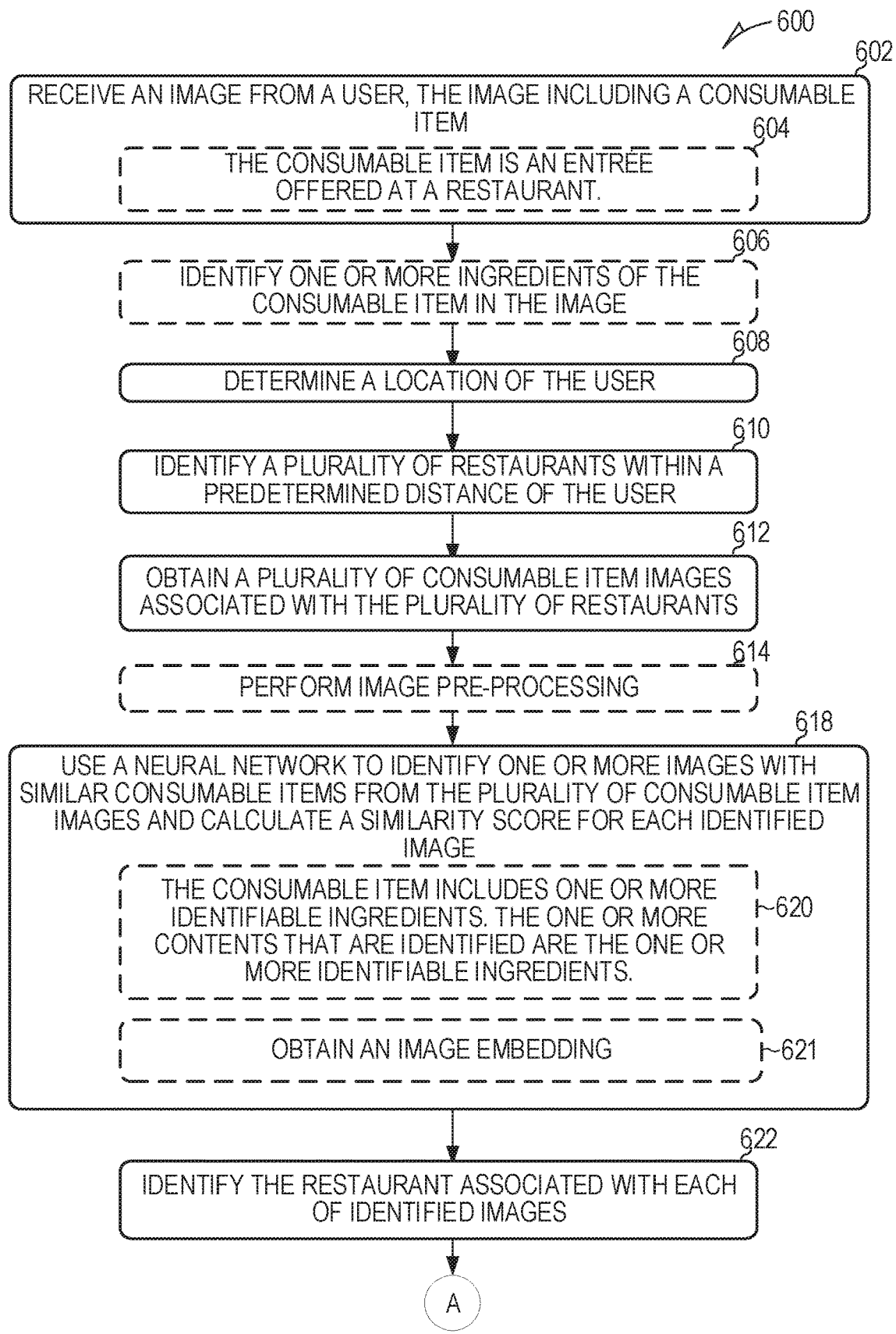
FIGS. 6A-6B depict an example flow diagram for user interface for viewing the results of an image query.
Figure 6B:
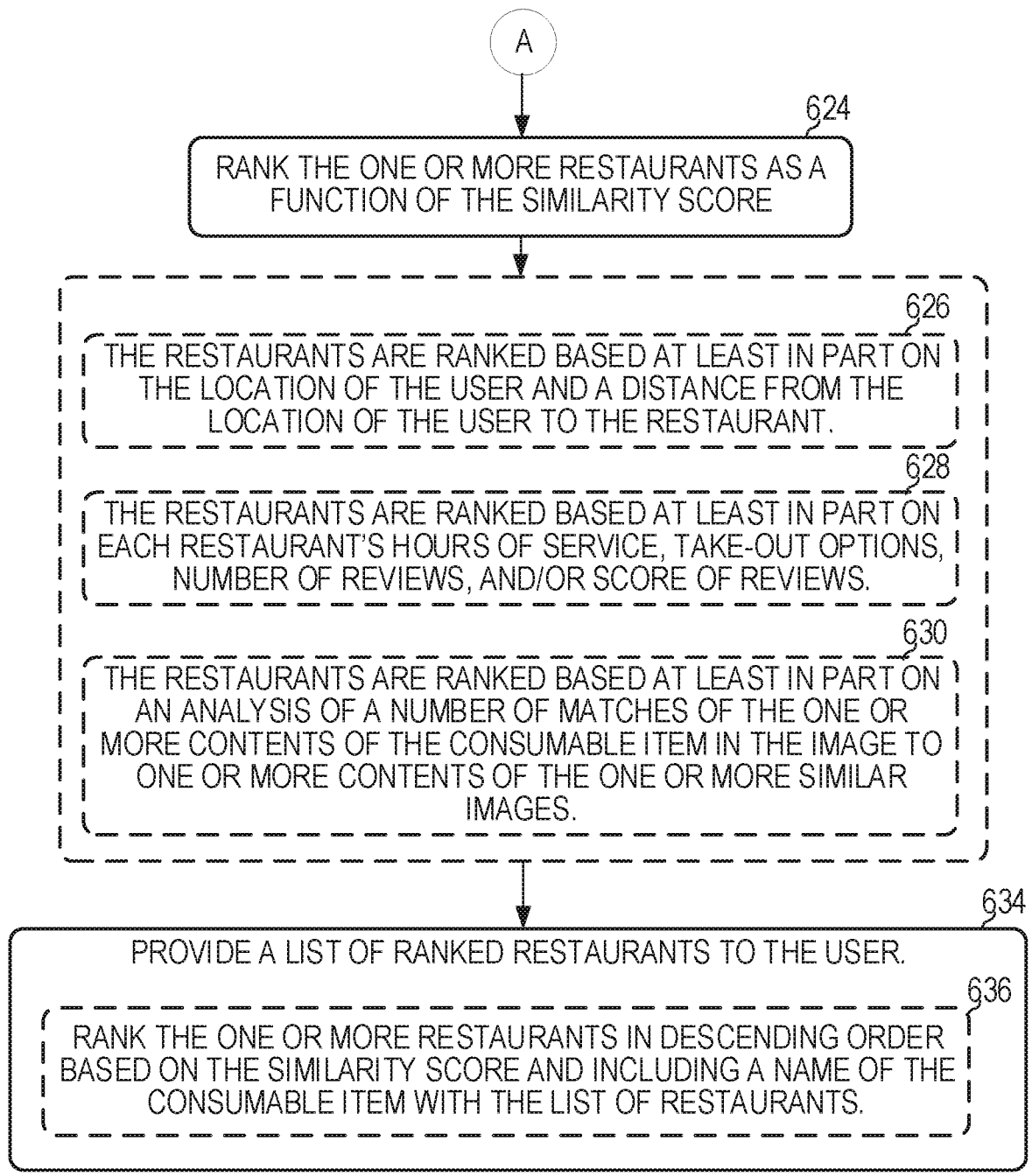

FIG. 6A-6B depict an example process 600 for identifying search image contents according to some embodiments. Process 600 executes on a computing device such as consumable item identification engine server 202. Process 600 proceeds at 602 where a computing device (e.g., server system) receives an image associated with a consumable item from a restaurant. In some embodiments, the received image is sent by a user 102 of an electronic device (e.g., client device 100). For example, a user uploads an image to a search engine (e.g., Microsoft Bing) to request identification of the image contents. In some embodiments, the consumable item is 604 an entrée offered at a restaurant. In some embodiments, the consumable item is a beverage, dessert, or appetizer offered at a restaurant.

In some embodiments, the computing device identifies 606 one or more contents (e.g., ingredients) of the consumable item in the image. In some embodiments, the computing device determines 608 a location of the user. In some embodiments, the computing devices identifies 610 a plurality of restaurants within a predetermined distance of the user and further obtains 612 a plurality of consumable item images associated with the plurality of restaurants.

In some embodiments, after receiving the image from the user, the computing device performs 614 image pre-processing (e.g., at image processing module 210). Image pre-processing can include image resizing, de-skewing, channel-wise normalization, cropping, and other suitable processes.

In some embodiments, the computing devices uses 618 a neural network to determine one or more similar images from a database, the one or more similar images include the one or more contents of the consumable item in the image. In some embodiments, the consumable item includes 620 one or more identifiable ingredients. The one or more contents that's are identified in the image are the one or more identifiable ingredients. For example, an image of miso soup is uploaded by the user. In the miso soup, tofu cubes, fish cakes, and green onions are visible. The visible ingredients are identified as being part of the miso soup and a list of the ingredients (e.g., tofu cubes, fish cakes, and green onion) is provided to the user. In another example, a user may indicate that the user is interested in a specific ingredient and wishes to receive results that include the specific ingredient. A user may be searching for miso soup that specifically includes fish cake and the search results are filtered and ranked according to the results. The results that include the fish cake are ranked higher than results that do not and are presented to the user.

In some embodiments the computing device obtains 621 an image embedding. In some embodiments, the image embedding is reduced using a dimensionality reduction technique such as principal component analysis (PCA).

In some embodiments, the computing device determines 622 a restaurant associated with each of the one or more similar images. Continuing in the example discussed above, miso soup is identified as being the food content in the image. The computing device may determine one or more images from a database also containing miso soup and a corresponding restaurant from which the images were taken (e.g., determined based on image metadata).

The method 600 continues in FIG. 6B. In some embodiments, the computing device calculates 624 a similarity score indicating at least a similarity between one or more restaurants offering a consumable dish associated with the identified one or more contents of the image. In some embodiments, the restaurants are ranked 626 based at least in part on the location of the user and a distance from the location of the user to the restaurant. In some embodiments, the restaurants are ranked 628 based at least in part on each restaurant's hours of service, take-out options, number of reviews, or score of reviews (e.g., ratings). In some embodiments, the restaurants are ranked 630 (e.g., via learning module based at least in part on an analysis of a number of matches of the one or more contents of the consumable item in the image to one or more contents of the one or more similar images.

For example, the computing system receives an image of miso soup and identifies three similar images to the received image. The three similar images are of miso soup (the correct and closest match), spicy miso soup, and bone broth. For each of the similar images, a restaurant serving the food content is identified. Restaurant A is identified as serving miso soup, restaurant B is identified as serving spicy miso soup, and restaurant C is identified as serving bone broth. Next, a similarity score is calculated to quantify a similarity between the soup and identified restaurant to the content of the received image (miso soup). The search results aim to identify restaurants local to the user that serves the food content in the image search. Thus, the similarity score for restaurant A may be higher than the similarity scores for restaurant B and C based on the distance between each restaurant to the user. The similarity scores for restaurants A, B, and C may also be defined by each restaurant's hours of service, pricing, take-out options, health scores, reviews, and/or ratings. The similarity scores for restaurants A, B, and C may also be defined by further analysis of a number of matches of the one or more contents (e.g., ingredients) identified in the received image.

In some embodiments, the computing device ranks 624 the one or more restaurants as a function of the similarity score. The ranking may be calculated as an average, a weighted average or other suitable mathematical calculation to organize the one or more restaurants in a list. In some embodiments, the computing device provides 634 a ranked list of restaurants associated with the one or more similar images based at least on the similarity score and a distance of the restaurant to the location of the user. In some embodiments, the computing system ranks 636 the one or more restaurants in descending order based on the similarity score and includes a name of the consumable item with the ranked list of restaurants.

Figure 7:
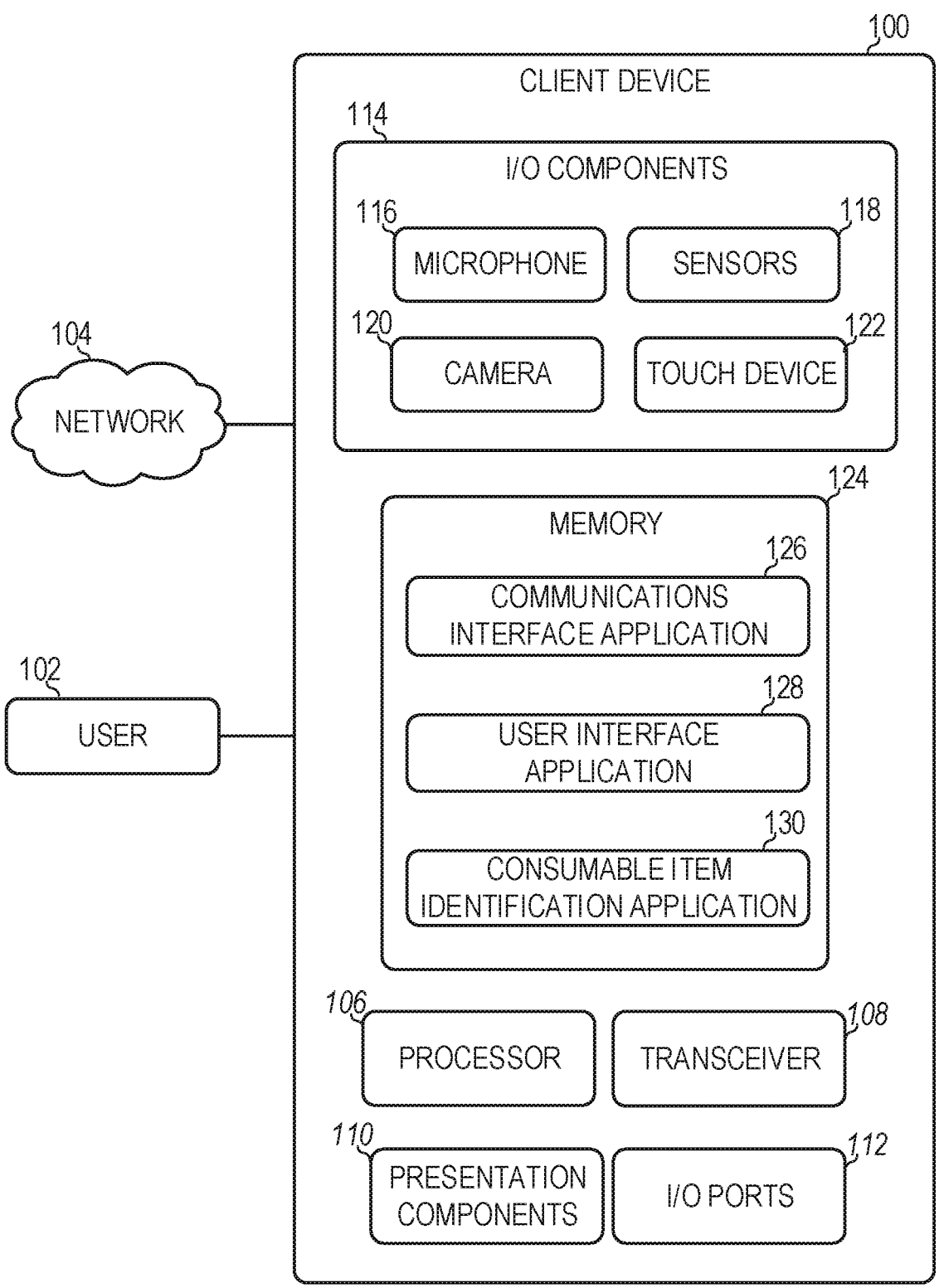
FIG. 7 is a block diagram of an example networked system depicting an environment in which embodiments may operate.

FIG. 7, depicts a block diagram that illustrates an example client device 100 for collecting and providing user and environment data. In some examples, the client device 100 has at least one processor 106, a transceiver 108, one or more presentation components 110, one or more input/output (I/O) ports 112, one or more I/O components 114, and a memory 124.

The client device 100 may take the form of a mobile computing device or any other portable device, such as, a mobile telephone, laptop, tablet, computing pad, notebook, gaming device, portable media player, etc. The client device 100 may also include less portable devices such as desktop personal computers, kiosks, tabletop devices, industrial control devices, etc. Other examples may incorporate the client device 100 as part of a multi-device system in which two separate physical devices share or otherwise provide access to the illustrated components of the computing device 100.

The processor 106 may include any quantity of processing units and is programmed to execute computer-executable instructions for implementing aspects of the disclosure. The instructions may be performed by the processor or by multiple processors within the computing device or performed by a processor external to the computing device. In some examples, the processor 106 is programmed to execute methods such as the one illustrated in accompanying FIG. 8A-8B.

Additionally, or alternatively, some examples may make the processor 106 programmed to present an experience in a user interface ("UI"), e.g., the UI shown in FIGS. 5A-5D. Moreover, in some examples, the processor 106 may represent an implementation of techniques to perform the operations described herein. For example, the operations may be performed by an analog client device 100 and/or a digital client device 100.

The transceiver 108 is an antenna capable of transmitting and receiving radio frequency ("RF") signals. One skilled in the art will appreciate and understand that various antenna and corresponding chipsets may be used to provide communicative capabilities between the client device 100 and other remote devices. Examples are not limited to RF signaling, however, as various other communication modalities may alternatively be used.

The presentation components 110 visibly or audibly present information on the computing device 100. Examples of presentation components 110 include, without limitation, computer monitors, televisions, projectors, touch screens, phone displays, tablet displays, wearable device screens, televisions, speakers, vibrating devices, and any other devices configured to display, verbally communicate, or otherwise indicate image search results to a user. In some examples, the client device 100 may be a smart phone or a mobile tablet that includes speakers capable of playing audible search results to the user. In other examples, the client device 100 is a computer in a car that audibly presents search responses through a car speaker system, visually presents search responses on display screens in the car, e.g., situated in the car's dashboard, within headrests, on a drop-down screen, or the like, or a combination thereof. Other examples may present the disclosed search responses through various other display or audio presentation components 110.

I/O ports 112 allow the client device 100 to be logically coupled to other devices and I/O components 114, some of which may be built into client device 100 while others may be external. Specific to the examples discussed herein, I/O components 114 include a microphone 116, one or more sensors 118, a camera 120, and a touch device 122. The microphone 116 captures speech from the user 102 and/or speech of or by the user 102. The sensors 118 may include any number of sensors on or in a mobile computing device, electronic toy, gaming console, wearable device, television, vehicle, or other computing device 100. Additionally, the sensors 118 may include an accelerometer, magnetometer, pressure sensor, photometer, thermometer, global positioning system ("GPS") chip or circuitry, bar scanner, biometric scanner for scanning fingerprint, palm print, blood, eye, or the like, gyroscope, near-field communication ("NFC") receiver, or any other sensor configured to capture data from the user 102 or the environment. The camera 120 captures images or video of the user 102. The touch device 122 may include a touchpad, track pad, touch screen, or other touch-capturing device. The illustrated I/O components 114 are but one example of I/O components that may be included on the client device 100. Other examples may include additional or alternative I/O components 114, e.g., a sound card, a vibrating device, a scanner, a printer, a wireless communication module, or any other component for capturing information related to the user or the user's environment.

The memory 124 includes any quantity of memory associated with or accessible by the computing device 100. The memory 124 may be internal to the client device 100, as shown in FIG. 1, external to the client device 100, not shown in FIG. 1, or both. Examples of memory 124 may include, without limitation, random access memory (RAM), read only memory (ROM), electronically erasable programmable read only memory (EEPROM), flash memory or other memory technologies, CDROM, digital versatile disks (DVDs) or other optical or holographic media, magnetic cassettes, magnetic tape, magnetic disk storage or other magnetic storage devices, memory wired into an analog computing device, or any other medium for encoding desired information and for access by the client device 100. The terms computer-readable medium, machine readable medium, and storage device do not include carrier waves to the extent carrier waves are deemed too transitory. Memory 124 may also take the form of volatile and/or nonvolatile memory; may be removable, non-removable, or a combination thereof; and may include various hardware devices, e.g., solid-state memory, hard drives, optical-disc drives, etc. Additionally, or alternatively, the memory 124 may be distributed across multiple client devices 100, e.g., in a virtualized environment in which instruction processing is carried out on multiple client devices 100. The memory 124 stores, among other data, various device applications that, when executed by the processor 106, operate to perform functionality on the computing device 100. Examples of applications may include search applications, instant messaging applications, electronic-mail application programs, web browsers, calendar application programs, address book application programs, messaging programs, media applications, location-based services, search programs, and the like. The applications may communicate with counterpart applications or services such as web services accessible via the network 104. For example, the applications may include client-operating applications that correspond to server-side applications executing on remote servers or computing devices in the cloud.

Specifically, instructions stored in memory 124 comprise a communications interface application 126, a user interface application 128, and a consumable item identification application 130. In some examples, the communications interface application 126 includes computer-executable instructions for operating a network interface card and/or a driver for operating the network interface card. Communication between the client device 100 and other devices may occur using any protocol or mechanism over a wired or wireless connection, or across the network 104. In some examples, the communications interface application 126 is operable with RF and short-range communication technologies using electronic tags, such as NEC tags, Bluetooth® brand tags, or the like.

In some examples, the user interface application 128 includes a graphics application for displaying data to the user and receiving data from the user. The user interface application 128 may also include computer-executable instructions for operating the graphics card to display search results and corresponding images or speech on or through the presentation components 110. The user interface application 128 may also interact with the various sensors 118 and camera 120 to both capture and present information through the presentation components 110.

FIG. 8 is a block diagram of a networking environment 800 for providing image search results and recommendations on client device(s) 100. The networking environment 800 may include multiple client devices 100, or just one as shown in FIG. 2, a consumable item identification engine server 202, and a database 224 communicating over a network 104. In some examples, user and environment data are communicated by the client devices 100 over the network 104 to the consumable item identification engine server 202, and the consumable item identification engine server 202 generates tailored image search results that are provided back to the client devices 100 for presentation to their respective users 102.

The networking environment 800 shown in FIG. 8 is merely an example of one suitable computing system environment and is not intended to suggest any limitation as to the scope of use or functionality of examples disclosed herein. Neither should the illustrated networking environment 800 be interpreted as having any dependency or requirement related to any single component, module, index, or combination thereof.

The network 104 may include any computer network, for example the Internet, a private network, local area network (LAN), wide area network (WAN), or the like. The network 104 may include various network interfaces, adapters, modems, and other networking devices for communicatively connecting the client devices 100, the consumable item identification engine server 202, and the database 224. The network 104 may also include configurations for point-to-point connections. Computer networks are well known to one skilled in the art, and therefore do not need to be discussed in detail herein.

The client devices 100 may be any type of client device discussed above in reference to FIG. 1. Each client device 100 may capture user and/or environment data from their respective users and communicate the captured user and environment data over the network 104 to the consumable item identification engine server 202 and/or the database 224. To do so, each device may be equipped with a communications interface application 126, as discussed above in reference to FIG. 1. In response, the consumable item identification engine server 202 may be capable of providing intelligent image search results including restaurant, recipe, and ingredient recommendations to many client devices 100 capable of communicating their respectively captured user and environment data over the network 104. Put another way, the consumable item identification engine server 202 may control image searches on many client devices 100.

The client device 100 may be equipped with various software applications and presentation components 110 for receiving image-based search queries and presenting recommended restaurants to their respective users. For example, a mobile phone may present a search bar or search screen for image search. The search bar/screen can receive a user selected image of various image file types. The image is processed through various systems of identifying content in images. The search service may then provide an ordered list of restaurants that provide (e.g., serve) the same or similar food items identified in the user selected image. The illustrated client devices and the aforesaid presentation mechanisms are not an exhaustive list covering all examples. Many different variations of client devices 100 and presentation techniques may be used to deliver the image search result responses to users.

The consumable item identification engine server 202 represents a server or collection of servers configured to execute different web-service computer-executable instructions. The consumable item identification engine server 202 includes a processor 204 to process executable instructions, a transceiver 206 to communicate over the network 104, and a memory 208 embodied with at least the following executable instructions: an image processing module 210, a recommendation generation module 220, and a learning module 222. The memory 208 may include instructions for content identification module 212, a restaurant module 214, a recipe module 216, and a location module 218. While consumable item identification engine server 202 is illustrated as a single box, one skilled in the art will appreciate that the consumable item identification engine server 202 may, in fact, be scalable. For example, the consumable item identification engine server 202 may include multiple servers operating various portions of software that collectively generate image search results on the client devices 100.

The database 224 provides backend storage of Web, user, and environment data that may be accessed over the network 104 by the consumable item identification engine server 202 or the client devices 100 and used by the consumable item identification engine server 202 to generate search results. The Web, user, and environment data stored in the database includes, for example but without limitation, user profiles 226, search context 228 and so on. Additionally, though not shown for the sake of clarity, the servers of the database 224 may include their own processors, transceivers, and memory. Also, networking environment 800 depicts the database 224 as a collection of separate devices from the consumable item identification engine server 202; however, examples may actually store the discussed Web, user, and environment data shown in the database 224 on the consumable item identification engine server 202.

Herein, a "user profile" refers to an electronically stored collection of information related to the user. Such information may include the user's name, age, gender, height, weight, demographics, current location, residency, citizenship, family, friends, schooling, occupation, hobbies, skills, interests, Web searches, health information, birthday, anniversary, celebrated holidays, moods, user's condition, and any other personalized information associated with the user. The user profile includes static profile elements, e.g., name, birthplace, etc., and dynamic profile elements that change over time, e.g., residency, age, condition, etc. The user profile may be built through probing questions to the user or through analyzing the user's behavior on one or more client devices.

Additionally, user profiles 226 may include static and/or dynamic data parameters for individual users. Examples of user profile data include, without limitation, a user's age, gender, race, name, location, interests, Web search history, social media connections and interactions, purchase history, routine behavior, jobs, or virtually any unique data points specific to the user. The user profiles 226 may be expanded to encompass various other aspects of a user's life.

During operation, a user employs client device 100 to perform an image search. In some embodiments, the client device sends a request to a server system (e.g., consumable item identification engine server 202), rather than performing the search itself. For example, a user sees a photograph of a food item on social media. However, the photograph does not have any accompanying information about what it is, where it was from, what ingredients are included, etc. The user is curious and wants to find out more about the food in the photograph and sends the image as a search query to a search service provider (e.g., database such as Microsoft Bing), Various pre-processing techniques may be applied to the image including cropping, de-skewing, normalizing, etc. before an image embedding is created.

An embedding is a mapping of a discrete categorical variable to a vector of continuous numbers. In the context of neural networks, embeddings are low or high dimensional, learned continuous vector representations of discrete variables, and the vector representations typically range between 20-4000, but may fall outside of the given range as appropriate. Neural network embeddings are useful because they can reduce the dimensionality of categorical variables and meaningfully represent categories in the transformed space and can be used to find nearest neighbors in the embedding space. The nearest neighbors can be used to make recommendations based on user interests or cluster categories.

The image embedding is then analyzed through one or more convolutional neural networks to obtain k-nearest neighbor images in a trained embedding space. The k-nearest neighbor images are then analyzed by reviewing each image's label to create a created set of neighbor images with matching (or close to matching) labels. In some embodiments, the user is curious about the food in the photograph and wants to order the food at a local restaurant. In such scenarios, the server obtains the user's location and adds the local restaurant location information into the search criteria. The returned list of the images is from restaurants within a certain distance of the user.

EXAMPLES

1. A method includes receiving an image from a user, the image including a consumable item, determining a location of the user, identifying a plurality of restaurants within a predetermined distance of the user, obtaining a plurality of consumable item images associated with the plurality of restaurants, using a neural network, identifying, from the plurality of consumable item images, one or more images with similar consumable items, including calculating a similarity score for each identified image, wherein the one or more images with similar consumable items include one or more ingredients of the consumable item in the image, identifying the restaurant associated with each of the identified images, ranking the restaurants based on the similarity score, and providing a list of ranked restaurants to the user.

2. The method example 1 wherein the consumable item in an entrée offered at a restaurant.

3. The method of any of examples 1-2, further including performing image pre-processing including cropping, de-skewing, and resizing.

4. The method of any of examples 1-3, further comprises passing the image through one or more convolutional neural networks.

5. The method of any of examples 1-4, where the consumable item includes one or more identifiable ingredients and the one or more ingredients that are identified are the one or more identifiable ingredients.

6. The method of any of examples 1-5, where the restaurants are ranked at least in part on the location of the user and a distance from the location of the user to the restaurant.

7. The method of any of examples 1-6, where the restaurants are ranked at least in part on each restaurant's hours of service, take-out options, number of reviews, and/or score of review.

8. The method of any of examples 1-7, where the restaurants are ranked based at least in part on an analysis of a number of matches of the one or more ingredients of the consumable item in the image to one or more ingredients of the one or more similar images.

9. The method of any of examples 1-8, where providing a list of restaurants further includes ranking the one or more restaurants in descending order based on the similarity score and including a name of the consumable item with the list of restaurants.

10. A system, comprising a processor and a memory device coupled to the process and having a program stored thereon for execution by the processor to perform operations comprising receiving an image from a user, the image including a consumable item. The operations further include determining a location of the user, identifying a plurality of restaurants within a predetermined distance of the user, and obtaining a plurality of consumable item images associated with the plurality of restaurants. The operations further include using a neural network for identifying, from the plurality of consumable item images, one or more images with similar consumable items including calculating a similarity score for each identified image. The one or more similar images include the one or more ingredients of the consumable item in the image. The operations further include identifying the restaurant associated with each of the identified images, ranking the one or more restaurants based on the similarity score, and providing a list of ranked restaurants to the user.

11. The system of example 10, where the consumable item is an entrée offered at the restaurant 12. The system of any of examples 10-11, further including performing image pre-processing to obtain an image embedding.

13. The system of any of examples 10-12 where performing image pre-processing comprise passing the image through one or more convolutional neural networks.

14. The system of any of examples 10-13, where the consumable item includes one or more identifiable ingredients, the one or more ingredients that are identified are the one or more identifiable ingredients.

15. The system of any of examples 10-14, where the restaurants are ranked at least in part on the location of the user and a distance from the location of the user to the restaurant.

16. The system of any of examples 10-15 where the restaurants are ranked similarity score is based at least in part on each restaurant's hours of service, take-out options, number of reviews, and/or score of review.

17. The system of any of examples 10-16 where the restaurants are ranked at least in part on an analysis of a number of matches of the one or more contents of the consumable item in the image to one or more contents of the one or more similar images.

18. The system of any of examples 10-17, where providing a list of restaurants further comprises ranking the one or more restaurants in descending order based on the similarity score and including a name of the consumable item with the list of restaurants.

19. A computer-readable storage medium stores one or more programs, the one or more programs including instructions which when executed by one or more processors of an electronic device, cause the electronic device to perform operations to perform a method. The operations include receiving an image from a user, the image including a consumable item, determining a location of the user, identify a plurality of restaurants within a predetermined distance of the user, obtain a plurality of consumable item images associated with the plurality of restaurants, using a neural network, identifying one or more images with similar consumable items from the plurality of consumable item images and calculating a similarity score for each identified image, the one or more similar consumable items include the one or more ingredients of the consumable item in the image. The operations further include identifying a restaurant associated with each of the identified images, ranking the one or more restaurants based on the similarity score, and providing a list of ranked restaurants to the user.

20. The computer readable storage medium of example 19, where providing the ranked list of restaurants further comprises providing a list of the one or more identified contents of the consumable item in the image.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

In the description herein, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

The invention claimed is:

1. A method of ranking restaurants at a computing device, comprising:
receiving, at the computing device, an image from a client device coupled to the computing device over a network, the image including a consumable food item;
pre-processing the received image, including passing the received image through one or more convolutional neural networks to obtain an image embedding of the received image and determine the contents of the received image, including the consumable food item;
determining a location of the client device;
identifying a plurality of restaurants within a predetermined distance of the client device;
obtaining a plurality of consumable food item images associated with the plurality of restaurants;
using a neural network at the computing device, identifying, from the plurality of consumable food item images, one or more images with similar consumable food items to the consumable food item in the image embedding, wherein identifying the one or more images includes calculating a similarity score for each of the identified one or more images;
identifying the restaurant associated with each of the identified one or more images and the name of the consumable food item in each of the identified one or more images at each respective identified restaurant;
ranking the identified restaurants based on aspects for each respective identified restaurant including the calculated similarity score for each of the identified one or more images, a distance from the location of the client device to the respective identified restaurant, and a score of reviews of the respective identified restaurants, wherein a weight of the different aspects of the ranking are determined based at least in part on information from a user profile associated with the client device; and
causing a list of ranked restaurants to be displayed at a user interface of the client device and the name of the consumable food items at the list of ranked restaurants.

2. The method of claim 1, wherein the consumable food item is an entrée offered at a restaurant.

3. The method of claim 1, wherein pre-processing the received image further includes cropping, de-skewing, and resizing the received image,
wherein the image embedding comprises a mapping of a discrete categorical variable to a vector of continuous numbers to reduce dimensionality of categorical variables, and
wherein identifying the one or more images with similar consumable food items to the consumable food item in the image embedding comprises identifying one or more nearest neighbors in an embedding space and providing k-nearest neighbor recommendations.

4. The method of claim 1, wherein the neural network at the computing device is trained to recognize ingredients,
wherein identifying, from the plurality of consumable food item images, one or more images with similar consumable food items includes identifying one or more images with similar ingredients of the consumable food item in the image, and
wherein the consumable food item includes one or more identifiable ingredients, the one or more ingredients that are identified are the one or more identifiable ingredients.

5. The method of claim 1, wherein the aspects of the ranking further include hours of service, take-out options, and number of reviews.

6. The method of claim 1, wherein the neural network at the computing device is trained to recognize ingredients,
wherein identifying, from the plurality of consumable food item images, one or more images with similar consumable food items includes identifying one or more images with similar ingredients of the consumable food item in the image, and
wherein ranking the identified restaurants are further based at least in part on an analysis of a number of matches of the one or more ingredients of the consumable food item in the image to one or more ingredients of the one or more similar images.

7. The method of claim 1, wherein providing a list of restaurants further comprises ranking the one or more restaurants in descending order based on the aspects and including the name of the consumable food item with the list of ranked restaurants.

8. The method of claim 1, wherein a weight of the score of reviews is greater than the distance from the location of the client device to the respective identified restaurant based on a parameter from the user profile of a user associated with the client device.

9. The method of claim 1, wherein the predetermined distance is determined at least in part by information from the user profile associated with the client device.

10. A system, comprising:
a processor; and
a memory device coupled to the processor and having a program stored thereon for execution by the processor to perform operations comprising:
receiving an image from a client device, the image including a consumable food item;
pre-processing the received image, including passing the received image through one or more convolutional neural networks to obtain an image embedding of the received image and determine the contents of the received image, including the consumable food item;
determining a location of the client device;
identifying a plurality of restaurants within a predetermined distance of the client device;
obtaining a plurality of consumable food item images associated with the plurality of restaurants;
using a neural network, identifying, from the plurality of consumable food item images, one or more images with similar consumable food items to the consumable food item in the image embedding, wherein identifying the one or more images includes calculating a similarity score for each of the identified one or more images;
identifying the restaurant associated with each of the identified one or more images and the name of the consumable food item in each of the identified one or more images at each respective identified restaurant;
ranking the identified restaurants based on aspects for each respective identified restaurant including the calculated similarity score for each of the identified one or more images, a distance from the location of the client device to the respective identified restaurant, and a score of reviews of the respective identified restaurants, wherein a weight of the different aspects of the ranking are determined based at least in part on information from a user profile associated with the client device; and
causing a list of ranked restaurants to be displayed at a user interface of the client device and the name of the consumable food items at the list of ranked restaurants.

11. The system of claim 10, wherein the consumable food item is an entrée offered at the restaurant.

12. The system of claim 10, wherein pre-processing the received image further includes cropping, de-skewing, and resizing the received image,
wherein the image embedding comprises a mapping of a discrete categorical variable to a vector of continuous numbers to reduce dimensionality of categorical variables, and
wherein identifying the one or more images with similar consumable food items to the consumable food item in the image embedding comprises identifying one or more nearest neighbors in an embedding space and providing k-nearest neighbor recommendations.

13. The system of claim 10, wherein the neural network device is trained to recognize ingredients,
wherein identifying, from the plurality of consumable food item images, one or more images with similar consumable food items includes identifying one or more images with similar ingredients of the consumable food item in the image, and
wherein the consumable food item includes one or more identifiable ingredients, the one or more ingredients that are identified are the one or more identifiable ingredients.

14. The system of claim 10, wherein the aspects of the ranking further include hours of service, take-out options, and number of reviews.

15. The system of claim 10, wherein the neural network device is trained to recognize ingredients,
wherein identifying, from the plurality of consumable food item images, one or more images with similar consumable food items includes identifying one or more images with similar ingredients of the consumable food item in the image, and
wherein ranking the identified restaurants are further at least in part on an analysis of a number of matches of the one or more ingredients of the consumable food item in the image to one or more contents of the one or more similar images.

16. The system of claim 10, wherein providing a list of restaurants further comprises ranking the one or more restaurants in descending order based on the aspects and including the name of the consumable food item with the list of ranked restaurants.

17. The system of claim 10, wherein a weight of the score of reviews is greater than the distance from the location of the client device to the respective identified restaurant based on a parameter from the user profile of a user associated with the client device.

18. The system of claim 10, wherein the predetermined distance is determined at least in part by information from the user profile associated with the client device.

19. A computer readable storage medium storing one or more programs, the one or more programs comprising instructions which when executed by one or more processors of an electronic device, cause the electronic device to perform operations, comprising:
receiving an image from a client device, the image including a consumable food item;
pre-processing the received image, including passing the received image through one or more convolutional neural networks to obtain an image embedding of the received image and determine the contents of the received image, including the consumable food item;
determining a location of the client device;
identifying a plurality of restaurants within a predetermined distance of the client device;
obtaining a plurality of consumable food item images associated with the plurality of restaurants;
using a neural network, identifying, from the plurality of consumable food item images, one or more images with similar consumable food items to the consumable food item in the image embedding, wherein identifying the one or more images includes calculating a similarity score for each of the identified one or more images;
identifying the restaurant associated with each of the identified one or more images and the name of the consumable food item in each of the identified one or more images at each respective identified restaurant;
ranking the identified restaurants based on aspects for each respective identified restaurant including the calculated similarity score for each of the identified one or more images, a distance from the location of the client device to the respective identified restaurant, and a score of reviews of the respective identified restaurants, wherein a weight of the different aspects of the ranking are determined based at least in part on information from a user profile associated with the client device; and
causing a list of ranked restaurants to be displayed at a user interface of the client device and the name of the consumable food items at the list of ranked restaurants.

20. The computer readable storage medium of claim 19, wherein the neural network device is trained to recognize ingredients,
wherein identifying, from the plurality of consumable food item images, one or more images with similar consumable food items includes identifying one or more images with similar ingredients of the consumable food item in the image, and
wherein the restaurants are ranked based at least in part on an analysis of a number of matches of the one or more identified ingredients of the consumable food item in the image to one or more ingredients of the one or more similar images.

* * * * *